April 16, 1963 C. J. TILTON 3,085,747

ASYNCHRONOUS MULTIPLIER

Filed June 30, 1959 7 Sheets-Sheet 1

INVENTORS
CHARLES J. TILTON

BY Thomas & Crickenberger
ATTORNEYS

April 16, 1963 C. J. TILTON 3,085,747

ASYNCHRONOUS MULTIPLIER

Filed June 30, 1959 7 Sheets-Sheet 2

April 16, 1963 C. J. TILTON 3,085,747

ASYNCHRONOUS MULTIPLIER

Filed June 30, 1959 7 Sheets-Sheet 3

United States Patent Office 3,085,747
Patented Apr. 16, 1963

3,085,747

ASYNCHRONOUS MULTIPLIER

Charles J. Tilton, Hyde Park, N.Y., assignor to International Business Machines Corporation, New York, N.Y., a corporation of New York Filed June 30, 1959, Ser. No. 824,105
17 Claims. (Cl. 235—165)

This invention relates to a multiplier and more particularly to an asynchronous multiplier for use in digital computers.

It has been customary in certain types of multipliers to derive a product of two binary numbers by sensing in sequence each bit of the multiplier number and generating a partial product. If a given bit of the multiplier is a One, the multiplicand is added to an accumulator and shifted one position to the right. If a given bit of the multiplier is a Zero, the content of the accumulator is merely shifted one position to the right. The process of sensing each bit of the multiplier and either adding the multiplicand to the accumulated partial products and shifting or merely shifting the accumulated partial products continues until the last partial product is completed at which time the accumulator holds the product.

In many of these multiplying devices an elaborate control element is employed, and a fixed period of time is alloted for generating each partial product regardless of whether the partial product requires an add operation plus a shift operation or merely a shift operation. With advances in the art certain improved multiplying devices resulted which employed a simplified control element where each partial product was generated by pulses directly from a clock. The time period alloted for generating each partial product remained fixed nevertheless because the clock pulses were separated in time by an amount sufficient to permit an add plus a shift operation in case such was necessary for a given partial product. Because the cycle for each partial product is alloted a fixed period of time, there is a loss of valuable computer time to the extent that certain partial products which involve merely a shift operation could be completed long before the fixed cycle is terminated.

According to this invention an improved multiplier is provided which eliminates the need for a clock during the multiply process, dispenses with the use of a control element once the multiply process is initiated, provides a cycle or period for a partial product which is variable depending upon whether a shift or an add plus a shift operation is required, and initiates the next partial product without delay as soon as one partial product is completed. This results in a multiplier which involves a simplified control element. Furthermore, the multiplying device generates a final product in a minimum period of time, this period varying as the number of binary Zeros in the multiplier is more or less.

According to one arrangement of this invention, the multiplier includes a multiplicand register, a multiplier register and an accumulator. Each bit of the multiplier is sensed in sequence. If the multiplier bit is a One, the content of the multiplicand register is added to the accumulator, and the accumulator is shifted one position. This constitutes a long multiply cycle. If the multiplier bit is a Zero, the accumulator is shifted one position. This constitutes a short multiply cycle. There are as many multiply cycles as there are bits in the multiplier, and each cycle causes one partial product to be generated.

Initially, the multiplicand is placed in the multiplicand register, the accumulator is cleared, and the multiplier is placed in the multiplier register. A pulse is employed to sense the lowest order bit of the multiplier register. If the multiplier bit is a One, the pulse causes the content of the multiplicand register to be added to the accumulator; the pulse is delayed until the addition process is completed at which time it shifts the accumulator and the multiplier register one position; and the same pulse is again delayed until the shift operation is completed at which time it returns to sense the next bit of the multiplier. This constitutes a long cycle. If the multiplier bit is a Zero, the pulse merely shifts the accumulator register and the multiplier register one position; the pulse is delayed until the shift operation is completed; and then the pulse returns to initiate the next partial product by sensing the next bit of the multiplier. This constitutes a short cycle. Thus it is seen that as soon as one multiply cycle is completed, the next one is initiated without delay. The single pulse is cycled repeatedly until the product is developed. A mechanism is employed to terminate the multiply operation after the generation of the proper number of partial products. This mechanism is preferably a counter which is set at the beginning of a multiply operation to a number that is one less than the proper number of partial products which must be generated. As soon as the first partial product is completed, the counter is stepped down, and it is likewise stepped down after each subsequent partial product. After the counter goes to Zero the circulating pulse which generates the various partial products is terminated.

A unique aspect of this invention is the use of the circulating pulse to sense each bit of the multiplier and effect either an add plus a shift operation or merely a shift operation. With this arrangement the need for a control element or a clock to generate a pulse for each partial product is eliminated. A further feature of this invention is the use of a long or a short cycle for each partial product with provision for initiating the next partial product as soon as a given partial product is completed. This saves valuable computer time and completes the multiply operation in the minimum period of time for a given multiplier number. The time required to generate a final product varies in direct proportion to the number of binary Zeros in the multiplier.

These and other features of this invention may be more fully appreciated when considered in the light of the following specification and the drawings in which.

Figure 1:
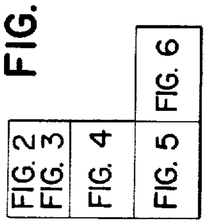
FIG. 1 illustrates the manner in which the drawings of FIGS. 2 through 6 should be arranged in order to illustrate the system aspects of this invention.

If FIGS. 2 through 6 are arranged in the manner indicated in FIG. 1, the system aspects of a multiplier system according to this invention are illustrated. The basic circuits illustrated in block form throughout these figures are shown in FIGS. 7 through 12 and are described subsequently. It should be stated at this point, however, that negative signals are significant and positive signals which may be at ground level, are not significant. In other words, the basic circuits are operated in response to negative signals while positive signals generally are ineffective. This type of logic is employed throughout the system of FIGS. 2 through 6 unless otherwise indicated.

Figures 2, 3:
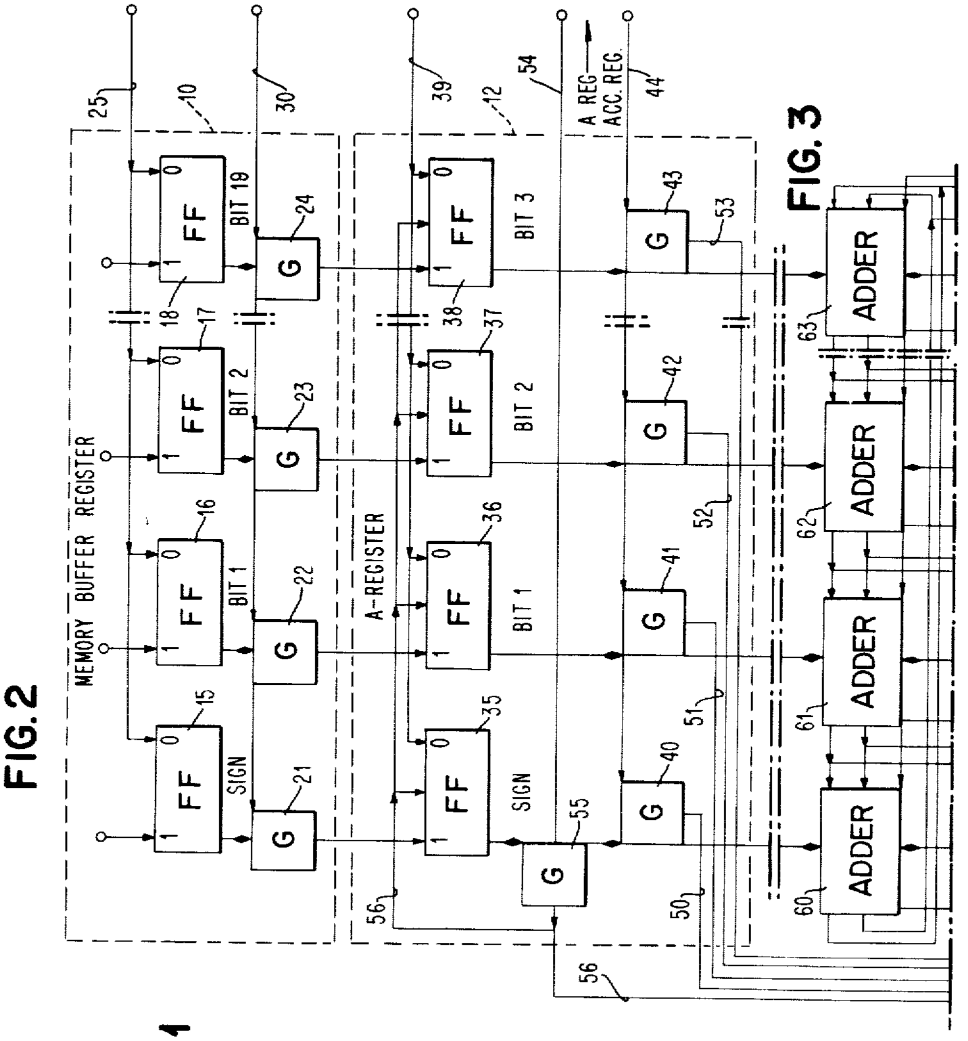
FIGS. 2 through 6 illustrate in block form a system arranged according to this invention.

Referring more specifically to FIG. 2, a memory buffer register 10 and an A-register are shown. The memory buffer register 10 receives data from a memory device, not shown. This register is composed of flip-flops 15 through 18 and associated gates 21 through 24, and it is cleared by a negative pulse applied to line 25. Data signals may then be applied to the One input side of these flip-flops to cause them to assume stable states representative of binary information. A negative pulse represents a binary One and a positive pulse, which may be at ground potential, represents a binary Zero. The negative pulses are effective to change the flip-flops 15 through 18 to the One state, thereby providing a negative signal from the One output side and a positive signal from the Zero output side. Whenever these flip-flops are cleared, a negative pulse is applied to the Zero input side, thereby providing a negative signal from the Zero output side and a positive signal from the One output side. Information stored in the flip-flops 15 through 18 may be transferred to the A-register 12 by applying a negative pulse to a line 30, and all gates receiving a negative level from the associated flip-flops emit negative signals on output conductors to the one input side of associated flip-flops 35 to 38 of the A-register 12. The A-register is cleared before a transfer by applying thereto a negative pulse to line 39. This resets the flip-flops 35 through 38 to the Zero state. Gates 40 through 43 are employed to transfer information from the A-register to the accumulator register in FIG. 4. When line 44 in FIG. 2 is energized with a negative signal, the gates 40 through 43 emit negative output signals if the associated flip-flops 35 through 38 condition the gates with a negative level. The negative output signals from these gates are applied on associated conductors 50 through 53 to the complement input of the flip-flops of the accumulator register in FIG. 4. Negative pulses on these lines represent binary One and no pulse represents binary Zero. A negative pulse on a line 54 in FIG. 2 samples a gate 55, and if the sign of the A-register as represented by the flip-flop 35 is One, the A-register is complemented by a negative pulse on line 56 which is applied to the complement inputs of the flip-flops 35 through 38. The purpose of complementing the A-register is explained more fully with a description of the multiply operation described hereinafter.

Referring next to FIG. 3, adder circuits 60 through 63 are illustrated in block form. These circuits receive D.C. level signals from the A-register in FIG. 2 and the accumulator register in FIG. 4 and provide a sum which is stored in the accumulator register in FIG. 4. This adder arrangement is a full adder with provision for end around carry although in a multiply operation, as performed by this device, the end around carry is not needed. The details of each adder and how it performs is described more specifically hereinafter with respect to FIG. 7.

Figure 4:
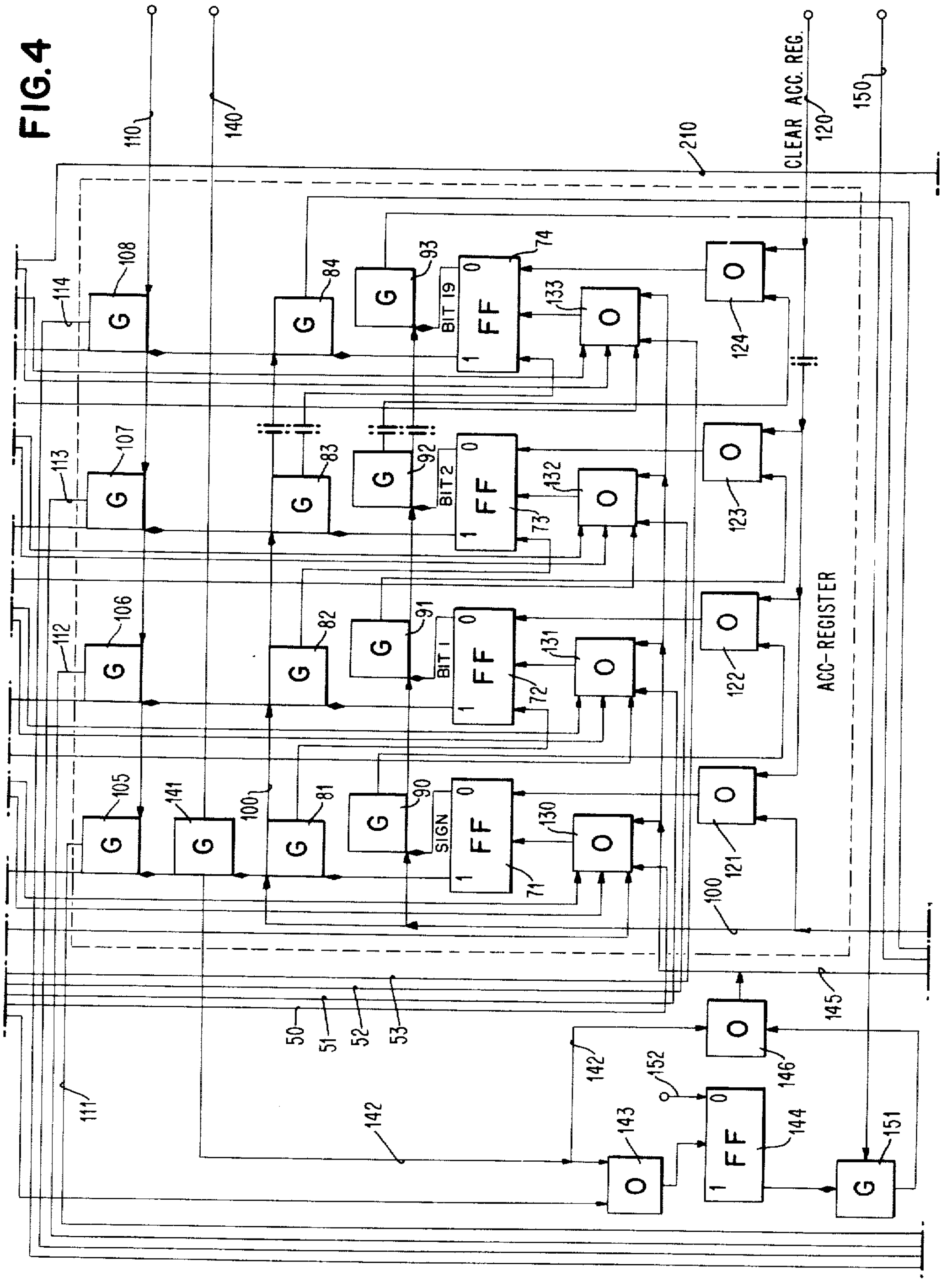

Referring next to FIG. 4, an accumulator register 70 is illustrated. This register is composed of flip-flops 71 through 74 with respective gates 81 through 84 disposed on the One output side and respective gates 90 to 93 disposed on the Zero output side. These gates serve as shift gates, and when a negative pulse is applied to line 100, all gates are sampled and the content of the associated flip-flop is transferred to the adjacent flip-flop. The transfer is to the right. Note for example that the gates 81 and 90 transfer the One and Zero condition of the sign flip-flop 71 to the adjacent flip-flop 72 in FIG. 4. The gate is disposed on the One output side of this flip-flop, and its output is connected to the One input side of flip-flop 72. In like fashion the gate 90 is disposed on the Zero output side of the flip-flop 71, and its output is connected to the Zero input side of the flip-flop 72. The transient time of a pulse through a gate is relatively small compared to the resolution time of the flip-flops. Whenever a negative pulse is applied to the conductor 100, the gates 81 through 83 and 90 through 93 supply input pulses to the adjacent flip-flops on the right before the existing condition of any of the flip-flops changes. It is pointed out that a negative pulse on the line 100 is connected to the Zero input of the flip-flop 71. Hence, this flip-flop is always placed in the Zero state each time the gates 81 through 84 and 90 through 93 are energized to cause a shift operation. This is done in order to clear the sign flip-flop whenever a transfer operation takes place because the sign flip-flop receives no information signals otherwise. For example, note that if the sign flip-flop 71 holds a One whenever a shift operation is initiated, the One is transferred to the flip-flop 72, but the flip-flop 71 still retains a One afterward, whereby an erroneous indication remains after the shift operation is completed. Hence, to avoid this the pulse on the line 100 is coupled to the Zero input side of the flip-flop 71 so as to clear this flip-flop to the Zero side after each transfer operation.

Figure 5:
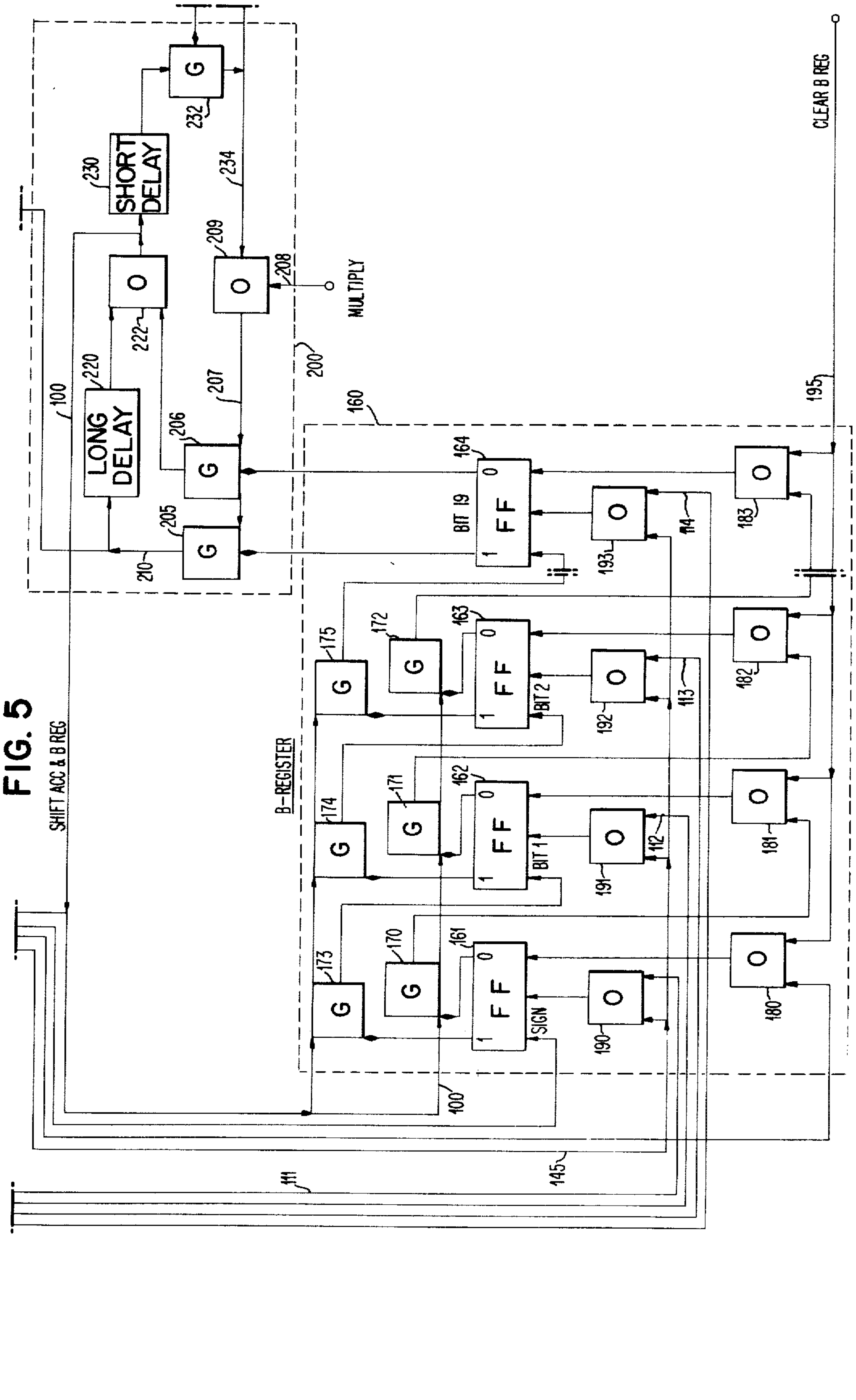

Transfer gates 105 through 108 are disposed on the One output side of associated flip-flops 71 through 74, and whenever line 110 receives a negative pulse, these gates provide negative output pulses on associated conductors 111 through 114 to the B-register in FIG. 5. This in effect transfers the content of the accumulator register to the B-register. The accumulator register is cleared by a negative pulse on a line 120 in FIG. 4. This pulse is coupled to OR circuits 121 through 124 which in turn are coupled to the Zero input side of respective flip-flops 71 through 74. OR circuits 130 through 133 are connected to the complement input of respective flip-flops 71 through 74. These OR circuits are energized with negative pulses when information is transferred from the A-register in FIG. 1 to the accumulator register in FIG. 4. Prior to the transfer of information, a negative pulse is applied to the line 120 to clear the flip-flops in the accumulator register by setting them to the Zero state. Subsequently, information transferred on the lines 50 through 53 causes given ones of the flip-flops 71 through 74 to be complemented to the One state if a negative pulse is received on the associated complement inputs. The OR circuits 130 through 133 receive negative pulse signals from respective adders 61, 62, 63 and 60 in FIG. 3 whenever an addition operation takes place.

If a negative pulse is applied to a line 140, a gate 141 emits a negative output pulse if the sign flip-flop 71 is in the One state. An output pulse from the gate 141 is applied on line 142 to an OR circuit 143 which in turn is connected to the complement input of a flip-flop 144. A negative pulse on line 142 is applied also to an OR circuit 146. The output of OR circuit 146 is coupled to a line 145 which in turn is coupled to the OR circuits 130 through 133 of the accumulator register. The line 145 in FIG. 4 is coupled further to the complement inputs of the B-register in FIG. 5. Hence the accumulator register and the B-register are complemented by a negative pulse on the line 145. Actually, a negative pulse on the line 140 in FIG. 4 serves to inspect the accumulator sign for One, and if the sign is a One, the sign is made Zero by complementing both the accumulator register in FIG. 4 and the B-register in FIG. 5. At the same time the flip-flop 144 serves as a sign storage device and is complemented in case the accumulator sign is One. This is done preliminary to a multiply operation. After a multiplication operation is completed, a negative pulse on a line 150 in FIG. 4 is applied to a gate 151 for the purpose of correcting the sign of the product. In the multiplier of this invention, a negative sign is arbitrarily indicated by a One in the sign bit of the accumulator register. A positive or plus sign is indicated by a Zero in the sign bit. This is true for data stored in the A-register, the accumulator register or the B-register. As pointed out earlier the sign of the A-register in FIG. 2 is sampled by a negative pulse on the line 54. If its sign is negative, the flip-flop 35 in FIG. 1 supplies a negative signal to the gate 55 which passes the negative pulse from the line 54 to the line 56 which in turn couples the pulse to the OR circuit 143 in FIG. 4 and complements the flip-flop 144. The sign of the accumulator register in FIG. 4 is likewise sampled by a negative pulse on the line 140, and if the sign is negative the gate 141 is conditioned with a negative signal and passes the negative pulse through the OR circuit 143 to complement the flip-flop 144. The flip-flop 144 is set to the Zero state by a pulse on the Zero input line 152 before the sign of the A-register and the accumulator register are sampled. If the sign of the accumulator register and the A-register are negative, the flip-flop 144 is complemented twice leaving this flip-flop in the Zero state and thereby indicating that the sign is positive. This indicates the sign of the final product. If either the A-register or the accumulator sign is negative and the other is positive, the flip-flop 144 is complemented only once, whereby the One output side provides a negative signal to the gate 151. This indicates that the sign of the product is negative. If the sign of the accumulator and the sign of the A-register are both positive, the flip-flop 144 is not complemented by the negative pulses ap plied to the line 54 in FIG. 2 or the line 140 in FIG. 4. Hence the One output side of the flip-flop 144 remains positive to the gate 151, and the gate 151 is not conditioned to pass a negative pulse on the conductor 150 in FIG. 4. It is seen therefore that if a pulse is applied to the line 150 in FIG. 4 after a multiply operation is completed, the sign control flip-flop 144 is sampled and the sign of the accumulator register 70 is adjusted if necessary.

Referring next to FIG. 5, a B-register 160 is shown which comprises flip-flops 161 through 164. Gates 170 through 172 are disposed on the Zero output side of flip-flops 161 through 163. Gates 173 through 175 are disposed on the One output side of the flip-flops 161 through 163. These gates serve as shift gates, and when pulsed by a negative pulse on conductor 100, they shift the content of each flip-flop one position to the right. It is recalled that the accumulator register in FIG. 4 is shifted to the right one position simultaneously as the B-register is shifted to the right One position by a pulse on the conductor 100. The content of the 19th bit held in the flip-flop 74 of the accumulator register in FIG. 4 is shifted to the sign bit held in the flip-flop 161 of the B-register in FIG. 5. The flip-flop 164 of the B-register has no shift gates since the flip-flop 164 always receives information but never transfers information during a shift operation. The flip-flops 161 through 164 of the B-register have respective OR circuits 180 through 183 connected to the Zero inputs thereof. OR circuits 190 through 193 are connected to the complement input of respective flip-flops 161 through 164. A negative pulse on conductor 195 is applied to the OR circuits 180 through 183, and this pulse serves to clear the B-register by setting all flip-flops to the Zero state. Information pulses on the lines 111 through 114 to the OR circuits 190 through 193 complement the flip-flops to the One state whenever a negative signal occurs on any one of these input lines.

According to one novel aspect of this invention, a control circuit 200 in FIG. 5 is provided which serves to initiate the next partial product as soon as the present partial product is completed. The novel control circuit 200 also samples each multiplier bit and causes an add plus a shift operation or merely a shift operation, depending upon whether the multiplier bit is respectively a One or Zero. The control circuit 200 includes gate circuits 205 and 206 disposed on the respective One and Zero output sides of the flip-flop 164 of the B-register. If the 19th bit of the B-register holds a Zero, the Zero output side of the flip-flop 164 is negative, and this signal conditions the gate 206 to pass a negative pulse from the line 207. If the flip-flop 164 holds a One, the One output side of this flip-flop provides a negative signal which conditions the gate 205 to pass a negative pulse from the line 207. It is seen therefore that a negative pulse on the line 207 must be passed by either the gate 205 or the gate 206.

Whenever a multiply operation is to be initiated, a negative pulse is applied to a line 208 and through an OR circuit 209 to the line 207. If the 19th bit of the B-register is a One, the gate 205 passes the negative pulse from the line 207. The negative pulse from the gate 205 is applied to a conductor 210 which initiates an add operation in each of the adders 60 through 63 in FIG. 3. The negative pulse on the line 210 is applied to a delay circuit 220 in FIG. 5. The delay circuit 220 serves to delay the negative pulse until the add operation in FIG. 3 is completed and the sum is stored in the accumulator register in FIG. 4. The negative pulse then emerges from the delay circuit 220 and is applied through an OR circuit 222 to the line 100. The negative pulse on the line 100 in FIG. 5 is applied to the shift gates of the accumulator register in FIG. 4 and the shift gates of the B-register in FIG. 5. As a consequence, the information contained in these registers is shifted one position to the right, and the sign bit of the accumulator register is set to Zero. The negative pulse on the line 100 is applied to a delay circuit 230, and it is delayed therein until the right shift of the accumulator register and the B-register is completed. The negative pulse then emerges from the delay circuit 230 and is applied to a gate 232. This gate is conditioned by a multiply control flip-flop 240 in FIG. 6 which is set to the One side by a pulse on input line 242 prior to commencing a multiply operation. Therefore, the negative pulse from the delay unit 230 is passed by the gate 232 on conductor 234 to the OR circuit 209. The negative pulse emerges from the OR circuit 209 on the conductor 207 and samples the gates 205 and 206 to sense the new information held in bit 19 of the B-register. If now the flip-flop 164 should hold a Zero, the negative pulse on the line 207 passes through the gate 206 to the OR circuit 222. A negative pulse is then established on the line 100 and merely causes the accumulator register and the B-register to be shifted one position to the right as previously explained. The negative pulse is delayed in the delay unit 230 and emerges therefrom as soon as the right shift operation of the accumulator register and the B-register is completed. The pulse again passes through the gate 232, the OR circuit 209, and along the conductor 207 to sense the new information held in the 19th bit of the B-register. The process is repetitive and the pulse continues to recycle until all bits of the multiplier held in the B-register have been sampled and either an add and shift operation or a shift operation only has been completed for each multiplier bit. The multiply operation is terminated by a counter in FIG. 6.

Figure 6:
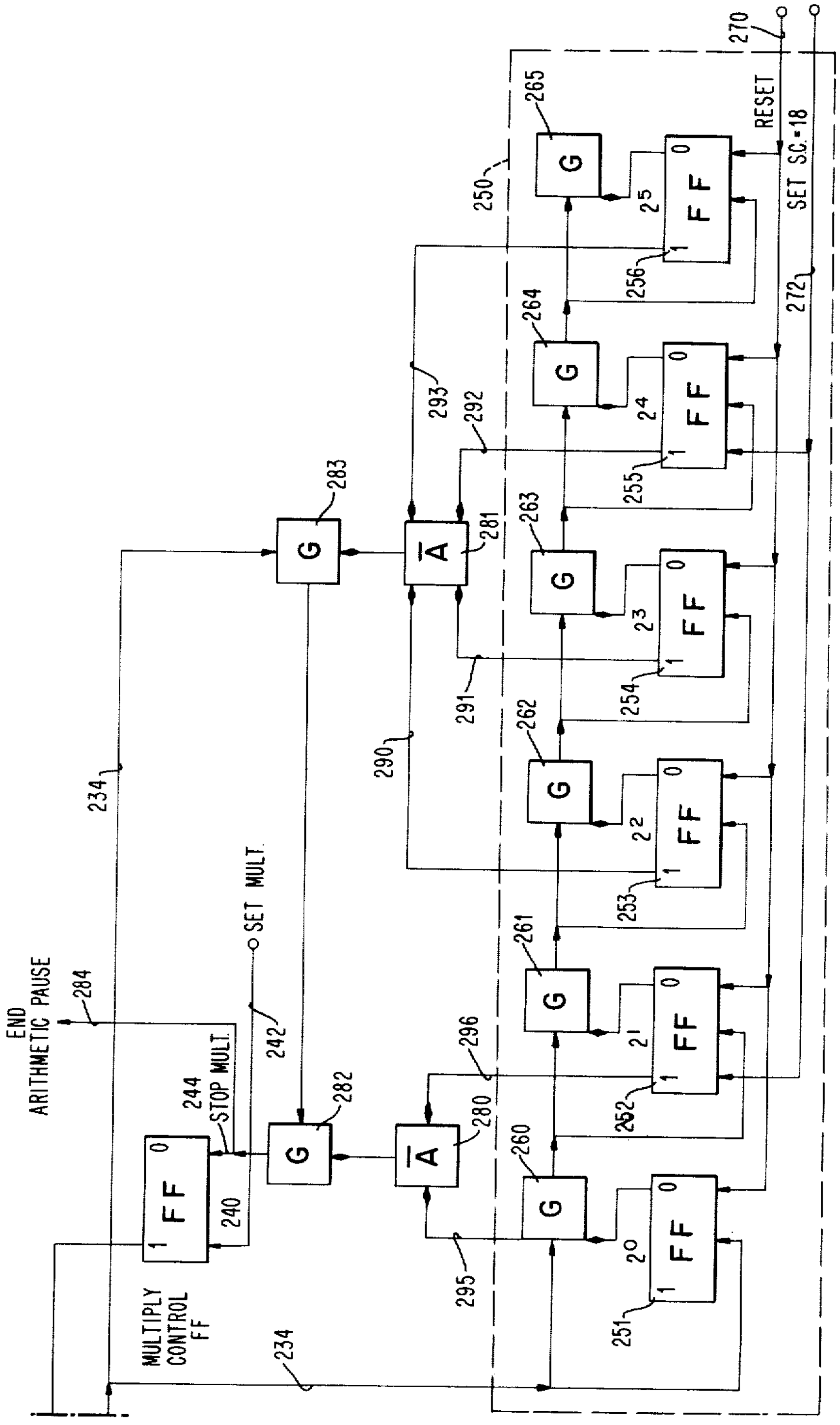

Referring next to FIG. 6, a step-time counter 250 is shown which includes flip-flops 251 through 256. Gates 260 through 265 are disposed on the Zero output side of respective flip-flops 251 through 256. The counter 250 is a step-down counter which is reset by a negative pulse on line 270. This reset pulse is applied to the Zero input side of each flip-flop and sets each to Zero, thereby conditioning each of the gates 260 through 265 with a negative signal. Prior to a multiply operation, a negative pulse is applied to the line 272 which sets the flip-flops 252 and 255 to the One state, and the counter holds a binary number which equals 18. Negative pulses from the gate 232 in FIG. 5 are applied to the line 234, and in addition to being applied to the OR circuit 209 for generating a partial product, these negative pulses are applied to the complement input of the flip-flop 251 of the counter 250 in FIG. 6. These pulses step the counter 250 down by a count of One for each negative input pulse. The B-register in FIG. 5 is shown with 19 bits, and if it is assumed that 19 partial products must be generated, the counter 250 in FIG. 6 is set to 18 by a negative pulse on line 272. The counter 250 is not set to 19 because the first pulse for generating a partial product is applied to the line 208 in FIG. 5, and the first partial product is generated before a negative pulse emerges from the gate 232 and passes on line 234 to the complement input of the flip-flop 251 of the counter 250 in FIG. 6.

The counter 250 in FIG. 6 is employed to stop the generation of partial products when 19 partial products have been generated. For this purpose $\overline{\text{AND}}$ circuits 280 and 281 in conjunction with associated gates 282 and 283 sense the content of the counter 250 after each partial product is generated. When 18 partial products have been generated, the negative pulse on the line 234 which initiates the 19th partial product is passed by gate 283 in FIG. 6 to gate 282, and this gate passes a negative pulse to the Zero input side of the multiply control flip-flop 244. When this flip-flop is set to the Zero state, the One output side goes positive to a potential at or above ground and deconditions the gate 232 in FIG. 5. This prevents further partial products from being generated, and the negative pulse on the line 284 may be employed in a control element, not shown, to inform the computing device that the generation of partial products is completed whereby the computer may proceed to terminate the multiply operation and store or otherwise process the product.

It is appropriate at this point to inquire further into the operation of $\overline{\text{AND}}$ ($\overline{\text{A}}$) circuits 280 and 281 in conjunction with the gates 282 and 283. Each of the $\overline{\text{AND}}$ circuits 280 and 281 provides a negative output signal whenever all of the inputs are positive or at ground level. The $\overline{\text{AND}}$ circuit 281 has input lines 290 through 293 which are connected to the one output side of respective flip-flops 253 through 256. Whenever all of these flip-flops are in the Zero state, the One outputs provide a positive or ground level signal to the $\overline{\text{AND}}$ circuit 281. At this point, the content of the counter 250 is equal to or less than 3, and the $\overline{\text{AND}}$ circuit 281 supplies a negative signal to the gate 283 which conditions this gate to pass the negative pulses from the line 234 to the gate 282. When the content of the counter 250 is equal to 3, both flip-flops 251 and 252 are in the One state. Hence the line 295 to the $\overline{\text{AND}}$ circuit 280 is at ground level, but the line 296 is at a negative level so that the output signal from the $\overline{\text{AND}}$ circuit 280 is positive, thereby deconditioning the gate 282. When the content of the counter 250 is reduced to 2, the lines 295 and 296 to the $\overline{\text{AND}}$ circuit 280 have negative levels thereon and the output of this $\overline{\text{AND}}$ circuit remains positive deconditioning the gate 282. When the content of the counter 250 is reduced to One, the lines 295 and 296 to the $\overline{\text{AND}}$ circuit 280 are both positive or at ground potential, and the output signal from the $\overline{\text{AND}}$ circuit 280 is negative, thereby conditioning the gate 282. At this point 18 partial products are completed, and the negative pulse which initiates the 19th partial product emerges from the gate 232 in FIG. 5 and passes on the line 234 to the gate 283 in FIG. 6. This gate passes the negative pulse and in turn supplies the negative pulse to the gate 282. At this point the gate 282 is conditioned by the negative output level from the $\overline{\text{AND}}$ circuit 280 and passes a pulse on the conductor 284 which is applied to the Zero input side of the multiply control flip-flop 244. This resets the multiply control flip-flop 244 to Zero and deconditions the gate 232 in FIG. 5 so that no further partial product pulses may pass this gate. The negative pulse on the line 284 may be supplied to a control device, not shown, for terminating the multiply operation and disposing of the product held in the accumulator register and the B-register. The accumulator register and the B-register may be provided with transfer gates, similar to the gates 40 through 43 of the A-register in FIG. 1, for the purpose of transferring the product therefrom.

It is appropriate at this point to follow through with an illustration of what sequence of events might take place during a multiply operation. It is to be understood, however, that the illustrative steps set out below are typical of what might take place. In many instances various steps might be rearranged in a different sequence from that listed, and some of the steps might be performed simultaneously.

(1) Clear the memory buffer register 10 in FIG. 2. This is done by applying a negative pulse to the line 25 in FIG. 2.

(2) Transfer the multiplier to the memory buffer register. This is accomplished by applying negative signals to the One input side of flip-flops 15 through 18 of the memory buffer register 10 in FIG. 2 when these flip-flops are to represent a binary One. Where the flip-flops are to represent binary Zero, no signal is supplied to the One input thereof.

(3) Clear the A-register. This is performed by energizing the line 39 in FIG. 2 with a negative signal.

(4) Transfer the content of the memory buffer register 10 in FIG. 2 to the A-register 12. This is effected by energizing the line 30 in FIG. 2 with a negative signal. Consequently, the flip-flops 15 through 18 which are in the One state condition associated gates 21 through 24 with a negative signal, and the negative signal on the line 30 passes through such conditioned gates to the One input side of corresponding flip-flops 35 through 38 of the A-register 12.

(5) Clear the accumulator register 70 in FIG. 4. This is done by energizing the line 120 in FIG. 4 with a negative signal. Consequently, flip-flops 71 through 74 are reset to the Zero state.

(6) Transfer the content of the A-register 12 in FIG. 2 to the accumulator register 70 in FIG. 4 by energizing the line 44 in FIG. 2 with a negative signal. As a result, the gates 40 through 43 in FIG. 2 which are conditioned with a negative signal by associated flip-flops 35 through 38 emit negative signals on lines 50 through 53 to complement input of respective flip-flops 71 through 74 of the accumulator register 70 in FIG. 4. At this point the accumulator register holds signals representative of the multiplier.

(7) Clear the A-register. This is accomplished by energizing the line 39 in FIG. 2 with a negative signal, thereby resetting flip-flops 35 through 38 to the Zero state.

(8) Reset the sign control flip-flop 144, FIG. 4, to Zero and test the accumulator sign bit, flip-flop 71, for a One. A negative pulse is applied on input line 152 to reset the sign control flip-flop 144. If the sign of the multiplier is negative, the sign bit flip-flop 71 holds a One. If the sign of the multiplier is positive, the sign bit holds a Zero. The accumulator sign is sampled by a negative pulse on line 140 in FIG. 4. If the sign is positive, the gate 141 is not conditioned, and the negative pulse on line 140 is uneventful. If the sign of the multiplier is minus, the gate 141 in FIG. 4 is conditioned by a negative level from the One output side of the flip-flop 71, and the gate 141 passes a negative pulse on line 142 to the OR circuits 143 and 146, the outputs of which complement the flip-flops 144 and 71 through 74. The flip-flop 144 is set to the Zero state by a negative pulse on line 152 before the line 140 is energized with the negative signal. Consequently, the negative pulse from the gate 141 which complements the flip-flop 144 changes this flip-flop from the Zero state to the One state indicating that the sign of the multiplier is negative. It may be well to mention at this point that after the multiply operation is over, the line 150 in FIG. 4 is energized with a negative signal (see step 20) and the gate 151 emits a negative pulse to the OR circuit 146 whenever the sign of the multiplier is minus. The OR circuit 146 passes the negative pulse to line 145 which complements the accumulator register 70 in FIG. 4, thus, returning that register to its original state before complementing by the output of the gate 141 and also complements the B-register 160 in FIG. 5. The B-register need not be complemented in this instance, but no harm results in doing so. At this point the flip-flop 144 in FIG. 4 has the sign of the multiplier stored therein. It should be pointed out that a multiply operation is performed with positive numbers only, and this is why the multiplier is complemented in the accumulator register whenever the multiplier is a negative number as indicated by a One in the sign bit. A negative number is represented by the complement of its absolute value.

(9) Clear the B-register 160 in FIG. 5. This is accomplished by energizing the line 195 in FIG. 5 with a negative signal. This resets the flip-flops 161 through 164 to the zero state.

(10) Transfer the content of the accumulator register 70 in FIG. 4 to the B-register 160 in FIG. 5. This is done by energizing the line 110 in FIG. 4 with a negative signal. This causes the gates 105 through 108 which are conditioned with a negative signal from associated flip-flops 71 through 74 to pass a negative signal on respective lines 111 through 114 to the complement input of associated flip-flops 161 through 164. Thus the content of the accumulator register is now stored in the B-register.

(11) Clear the accumulator register 70 in FIG. 4. This is performed by energizing the line 120 in FIG. 4 with a negative signal, thereby resetting the flip-flops 71 to 74 to the Zero state.

(12) Clear the memory buffer register 10 in FIG. 2. This is done by energizing the line 25 in FIG. 2 with a negative signal, thereby resetting the flip-flops 15 through 18 to the Zero state.

(13) Transfer the multiplicand to the memory buffer register 10 in FIG. 2.

(14) Transfer the multiplicand in the memory buffer register to the A-register. This is effected by applying a negative signal to the line 30 in FIG. 2. The A-register now holds signals representative of the multiplicand.

(15) Test the sign of the A-register for a One by application of a pulse to the conductor 54. If the sign of the multiplicand in the A-register is positive as indicated by a Zero in the sign flip-flop 35, no action is taken because the multiplicand is a positive number. If the sign of the multiplicand is negative as indicated by a One in the flip-flop 35, then the sign control flip-flop 144 in FIG. 4 and the A-register 12 in FIG. 2 must be complemented. This is accomplished by energizing the line 54 in FIG. 2 with a negative signal, and if the sign flip-flop 35 in FIG. 2 holds a One, the gate 55 is conditioned and passes the negative pulse on the line 56. A negative pulse from the gate 55 energizes the line 56 to the OR circuit 143 in FIG. 4 and complements the sign control flip-flop 144. In addition, the flip-flops of the A-register 12 are complemented. The sign of the final product now is stored in the sign control flip-flop 144 in FIG. 4.

(16) Reset the step counter 250 in FIG. 6. This is done by energizing the line 270 in FIG. 6 with a negative signal, thereby resetting the flip-flops 251 through 256 to the Zero state.

(17) Set the step counter 250 in FIG. 6 to eighteen. This is accomplished by energizing the line 272 in FIG. 2 with a negative signal, thereby setting flip-flops 252 and 255 to the One state. Hence the step counter 250 now holds the binary representation of the number 18. The multiplicand now is held in the A-register 12 of FIG. 2; the multiplier is held in the B-register 160 in FIG. 5; and the step counter 250 in FIG. 6 is set to eighteen. At this time the computer control element, not shown, supplies a negative pulse to the line 208 in FIG. 5, and the computer control element goes into a pause, thereby terminating its operation until the multiplication process of generating partial products is completed. When the last partial product is initiated, a negative pulse on the line 284 in FIG. 6 terminates the pause of the computer control element and causes it to resume operation.

(18) Set the multiply control flip-flop 244 in FIG. 6 to the One state by a negative pulse on the input line 242.

(19) Multiply by generating successive partial products. The negative pulse on the line 208 which is received just before the computer control element enters a pause samples the lowest order bit of the multiplier. The lowest order bit of the multiplier is held by the flip-flop 164 (bit 19) of the B-register 160 in FIG. 5. The negative pulse on line 208 in FIG. 5 passes through the OR circuit 209 and on the line 207 to the gates 205 and 206. It is assumed for purposes of illustration that the flip-flop 164 holds a Zero, gate 206 is conditioned and gate 205 is not conditioned. Thus the gate 206 passes a negative pulse to the OR circuit 222. The negative pulse from the OR circuit 222 is applied on the line 100 to the shift gates of the accumulator register in FIG. 4 and the B-register in FIG. 5. Accordingly, the content of the accumulator register and the B-register is shifted one position to the right. Also the sign-flip-flop 71 of the accomumulator register in FIG. 4 is reset to the Zero state. The flip-flop 164 in FIG. 5 now holds the next to the lowest order bit of the multiplier (the 18th bit of the multiplier). The negative pulse from the OR circuit 222 in FIG. 5 is delayed in the delay circuit 230 until the right shift operation of the accumulator register and the B-register is completed. Then this pulse emerges from the delay circuit 230 and passes through the gate 232. This gate passes the negative pulse because the One output side of the multiply control flip-flop 244 is negative. It is recalled that the multiply control flip-flop 244 was set to the One side by a negative pulse on the line 242 before the computer control element entered a pause. The negative output pulse from the gate 232 passes through the OR circuit 209 and along the conductor 207 of the gates 205 and 206. This partial product was generated with a short delay which was just sufficient to permit the right shift of the accumulator and B registers. This constitutes a short cycle. It is pointed out that as soon as this cycle terminates the next one commences. It is assumed for purposes of illustration that the flip-flop 164 now holds a One, the gate 205 is thus conditioned and the gate 206 is not conditioned. Consequently, the negative pulse on the line 207 passes forthwith to the gate 205 and therethrough to the conductor 210 to generate the next partial product as soon as the preceding partial product is completed. A negative pulse on the conductor 210 is applied to each of the adder circuits 60 through 63 in FIG. 3 and causes the multiplicand in the A-register to be added to the content of the accumulator register in FIG. 4. The negative pulse on the line 210 is applied also to the delay unit 220 and is delayed therein a sufficient length of time to permit the add operation to be completed and the result stored in the accumulator register in FIG. 4. The negative pulse then emerges from the delay circuit 220 and passes through the OR circuit 222 to the conductor 100, thereby causing the accumulator register and the B-register to be shifted one position to the right and the sign flip-flop 71 of the accumulator to be reset to Zero. The negative pulse from the OR circuit is applied also to the delay unit 230 and is delayed therein for a sufficient length of time to permit the right shift operation of the accumulator register and the B-register to be completed. The pulse then emerges from the delay unit 230, passes through the gate 232 and the OR circuit 209 to sample the gates 205 and 206 again. The pulse in the control circuit 200 in FIG. 5 continues to circulate once for each partial product. That is, the circulating pulse is cycled as many times as there are bits in the multiplier. Each time the circulating pulse passes through the gate 232 in FIG. 5, it energizes the line 234 with a negative pulse, and this line is coupled to the complement input of the flip-flop 251 of the step time counter 250 in FIG. 6. This counter is stepped down once for each partial product commencing with the second partial product. When the step counter is stepped down to a count of One, the negative pulse from the gate 232 in FIG. 6 which initiates the 19th partial product is applied on the line 234 to the gate 283 in FIG. 6. This gate passes the negative pulse to the gate 282 which in turn passes the negative pulse on the line 284 to terminate the pause and to reset the multiply control flip-flop to Zero and thereby terminate the generation of partial products. When the multiply control flip-flop 244 is reset to Zero, no further negative pulses may cycle through the gate 232, and hence the generation of further partial products is inhibited. The pulse which generates the 19th partial product is stopped at the gate 232 in FIG. 5. By this time the control element of the computing device has assumed control and the pause is terminated.

(20) Correct the sign of the product which is in the accumulator register and the B-register. This is accomplished by energizing the line 150 in FIG. 4 with a negative signal. It is recalled that the sign of the final product is stored in the sign control flip-flop 144. Hence the negative pulse on the line 150 is passed by the gate 151 if the sign of the product is negative. The negative pulse on the line 150 is not passed by the gate 151 if the sign of the product is positive. If the sign of the product is negative, flip-flop 144 is in the One state and the negative pulse passed by the gate 151 is applied to the OR circuit 146 then to the conductor 145, thereby complementing the accumulator register in FIG. 4, and the B-register in FIG. 5.

(21) The correct product now is held in the accumulator register and the B-register with the proper sign indicated by the sign bit 71 of the accumulator register in FIG. 4. At this point the computer may dispose of the product and continue with the next instruction.

Transfer gates, not shown, may be provided for transferring the product held in the accumulator register and the B-register. Such gates may be similar to the gates 40 through 43 of the A-register in FIG. 1.

Figure 7:
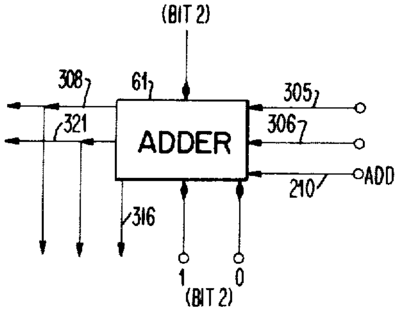
FIG. 7 illustrates an adder circuit suitable for use with this invention.
Figure 7:
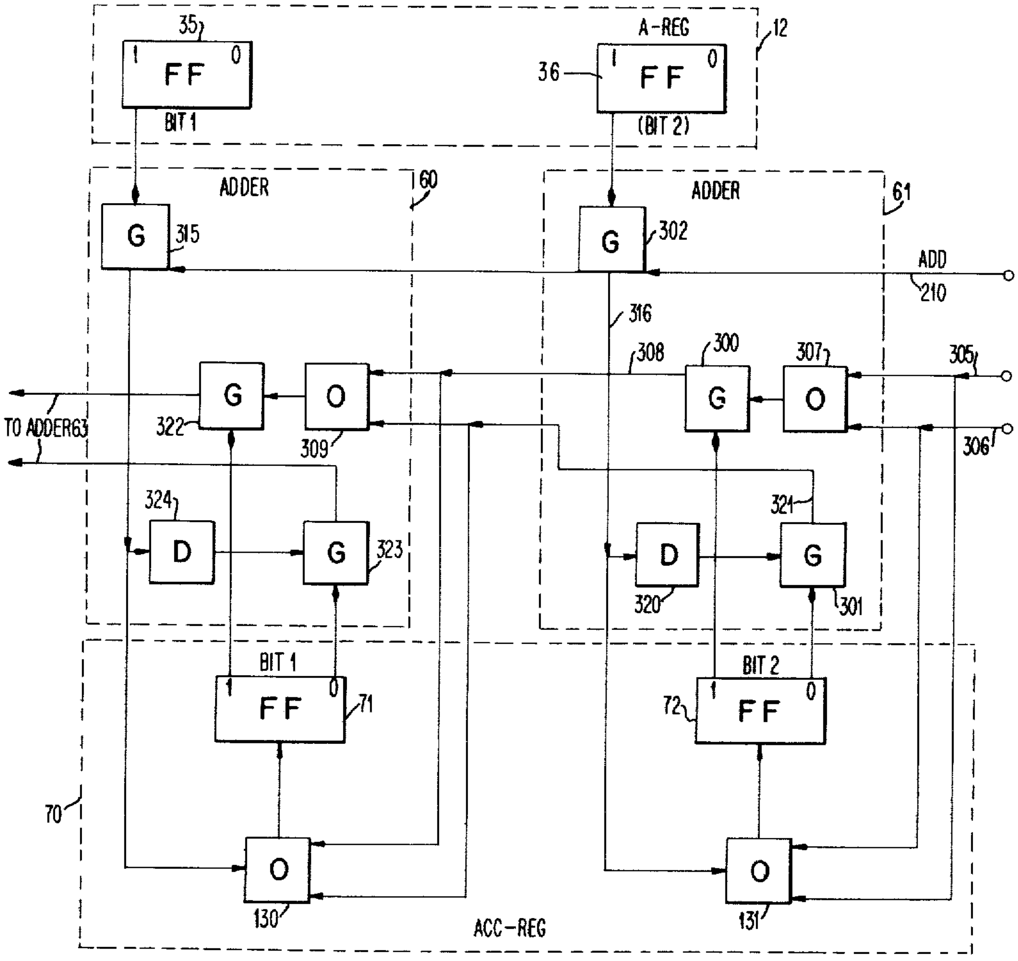

Referring next to FIG. 7, the adder circuits shown in block form in FIG. 3 are illustrated in detail. For convenience of illustration, bits 1 and 2 of the A-register in FIG. 2 and bits 1 and 2 of the accumulator register in FIG. 4 are illustrated with adders 60 and 61 shown in block form in FIG. 3. The same reference numerals are used to designate like parts in FIGS. 2, 3, 4 and 7. The adder 61 in FIG. 7 includes gates 300 and 301 disposed on the One and Zero output sides of the flip-flop 72 in the accumulator register 70. A gate 302 is disposed on the One output side of the flip-flop 36 in the A-register 12. Negative pulses on lines 305 and 306 from the preceding stage are applied through an OR circuit 307 to the gate 300. If this gate is conditioned by a negative signal from the One output side of the flip-flop 72, it passes a negative pulse on conductor 308 to the OR circuit 309 in the adder 60. This negative pulse is applied also to the OR circuit 130 which in turn is connected to the complement input of the flip-flop 71. Whenever a negative pulse is applied to the line 210, gates 302 and 315 are sampled. These gates transfer Ones in the A-register to the complement input of the corresponding flip-flop in the accumulator register. If, for example, the flip-flop 36 of the A-register is in the One stage when a negative pulse is applied to the line 210, the gate 302 passes a negative pulse on line 316 to the OR circuit 131. The output of the OR circuit is connected to the complement input of the flip-flop 72 and serves to reverse the state of this flip-flop. The negative pulse from the gates 302 is applied to a delay circuit 320, and a negative pulse emerges therefrom after a sufficient length of time has passed to permit the flip-flop 72 to be complemented and reach its new stable condition. The negative pulse from the delay circuit 320 samples the gate 301, and if the flip-flop 72 is then in the Zero state, a negative pulse is applied from the gate 301 on line 321 to the OR circuit 309 of the adder 60. This negative pulse is applied also to the OR circuit 130, thereby complementing the flip-flop 71. The adder 60 is identical in construction to the adder 61. Gate circuit 322, gate circuit 323 and delay circuit 324 perform the same function as gate 300, gate 301 and delay circuit 320 respectively in the adder 61.

Each adder is a full adder capable of adding the corresponding bits of the accumulator register and the A-register, storing the result in the accumulator register and transmitting any carry to the succeeding stage on the left. The validity of each adder may be readily checked by observing the truth table below:

*Truth Table*

| Case | Carry In | A-Reg. | Acc. Reg. | Sum | Carry |
|---|---|---|---|---|---|
| 1 | 0 | 0 | 0 | 0 | 0 |
| 2 | 0 | 0 | 1 | 1 | 0 |
| 3 | 0 | 1 | 0 | 1 | 0 |
| 4 | 0 | 1 | 1 | 0 | 1 |
| 5 | 1 | 0 | 0 | 1 | 0 |
| 6 | 1 | 0 | 1 | 0 | 1 |
| 7 | 1 | 1 | 0 | 0 | 1 |
| 8 | 1 | 1 | 1 | 1 | 1 |

For case 1 in the truth table the flip-flops 36 and 72 contain Zeros and there is no carry pulse into the adder 61 on either line 305 or 306. A negative pulse on line 210 is not passed by the gate 302, and the flip-flop 72 continues in the Zero state. For case 2 in the truth table, the flip-flop 36 contains a Zero and the flip-flop 72 contains a One. There is no carry input on either line 305 or 306 to the adder 61. The negative add pulse on the line 210 is not passed by the gate 302. The accumulator register continues in the One state to indicate a sum of One, and there is no carry from the adder 61. For case 3 in the truth table, the flip-flop 36 contains a One and the flip-flop 72 contains a Zero. There is no carry input pulse to the line 305 or the line 306. A negative add pulse on the line 210 is passed by the gate 302 and complements the flip-flop 72 from the Zero to the One state, thereby indicating a sum of One. There is no carry output from the adder 61 in this case. For case 4 in the truth table, the flip-flop 36 contains a One and the flip-flop 72 contains a One. There is no carry input on the line 305 or the line 306 to adder 61. A negative pulse on the line 210 is passed by the gate 302 to the line 3—6 and then to the OR circuit 131 to complement the flip-flop 72 from the One state to the Zero state. After the flip-flop 72 is set in the Zero state, the delayed pulse from the delay circuit 320 passes through the gate 301 to the line 321 and represents a carry of One to the adder circuit 60. This carry pulse also complements the flip-flop 71.

For cases 5 through 8 of the truth table, the same events take place as occurred in cases 1 through 4 with the exception that a carry One signal is supplied on either line 305 or line 306 to both OR circuits 131 and 307. Hence the sums indicated in cases 1 through 4 are complemented by the negative carry pulses to the OR circuit 131, and is readily observed that in cases 5 through 8 the sums are the complements of respective cases 1 through 4. As for the carry pulses generated in cases 5 through 8, these may be easily determined by noting that in case 5 the only input signal which is effective to make a change is the negative carry supplied on either line 305 or 306. This negative carry signal complements the flip-flop 72 from the Zero state to the One state, whereby this flip-flop indicates a sum of One. The negative carry pulse to the OR pulse circuit 307 does not pass the gate 300 because flip-flop 72 is in the Zero state when this pulse arrives. Hence there is no carry signal from the adder 61 in case 5 of the truth table. In the cases 6 and 7 of the truth table, it is readily seen that the flip-flop 72 is in the One state when a carry signal is applied through OR circuit 307 to the gate 300. Hence a carry of One is indicated by a negative signal on conductor 308 for cases 6 and 7. In case 8 of the truth table, a carry pulse is generated on the line 321 from the adder circuit 61. This may be seen by noting that the flip-flop 36 and the flip-flop 72 are both in the One state when a negative pulse is applied to the add line 210. Hence the gate 302 passes a negative pulse to the OR circuit 131 which is applied to the complement input of the flip-flop 72 to complement it from the One state to the Zero state. The pulse delayed in the delay circuit 320 is passed by the gate 301 as a negative pulse on line 321 indicating a carry of One. Subsequently, a negative pulse indicating a carry is applied to either line 305 or 306 from the preceding stage, and this negative pulse passes through the OR circuit 131 to complement the flip-flop 72 from the Zero state to the One state. The negative pulse on line 305 or 306 is applied to the OR circuit and then to the gate 300, but this gate is not conditioned in this instance, and hence no pulse is passed to the line 308.

Figure 8:
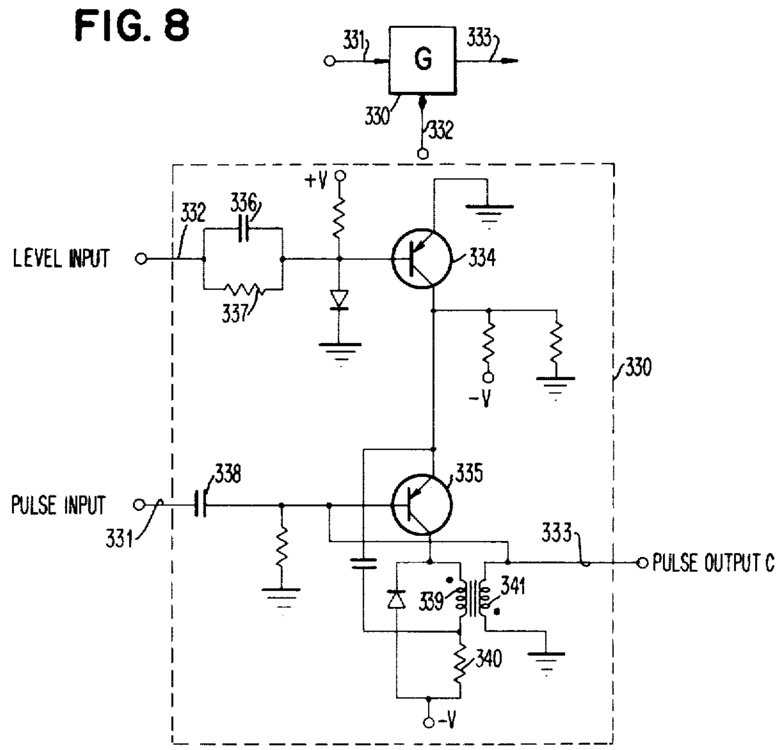
FIG. 8 shows a circuit schematic of a gate which may be employed for that illustrated in block form in FIGS. 2 through 6.

Referring next to FIG. 8, a gate circuit illustrated in block form throughout FIGS. 2 through 6 is shown in detail. The gate circuit 330 illustrated in block form in the upper right hand portion of this figure responds to a negative pulse on an input line 331 and a negative input level on a line 332 to provide a negative output pulse on a line 333. As shown in the circuit schematic of FIG. 8, this gate circuit includes two transistors 334 and 335 in series. If a negative input level is applied to the input line 332 and through the RC network 336, 337 to the base of transistor 334, this transistor is thus conditioned. If a negative input pulse is applied to the line 331 and through a condenser 338 to the base electrode of the transistor 335, the transistor is rendered conductive because the transistor 334 has been conditioned by the negative level on input line 332. For the duration of the negative input pulse, current flows from ground through the transistor 334, the transistor 335, primary winding 339, and resistor 340 to a negative source of potential. Consequently, a negative pulse is induced in a secondary winding 340, and this pulse appears on the output conductor 333. If the input level to line 332 is positive or at ground potential when a negative pulse is applied to the input line 331, the transistor 334 is rendered non-conductive or is deconditioned, and the negative pulse applied to the base of the transistor 335 is ineffective to render this transistor conductive. Hence no current may flow through the primary winding 339, and no output pulse may be developed on the output conductor 333.

Figure 9:
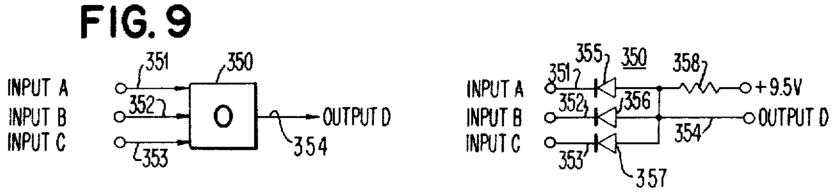
FIG. 9 illustrates a circuit schematic of an OR circuit which may be employed for that shown in block form throughout FIGS. 2 through 6.

Referring next to FIG. 9, an OR circuit 350 is illustrated in detail. The OR circuit 350 in FIG. 9 responds to a negative pulse on any one of the input lines 351, 352 or 353 and provides a negative output pulse on an output line 354. As illustrated in the right hand portion of this figure, diodes 355, 356 and 357 are connected as shown through a resistor 358 to a positive source of potential. Normally the input conductors 351 through 353 are at ground potential, and all of the diodes 355 through 357 are conductive. Hence the output potential on the line 354 is normally at or slightly above ground potential. If a negative pulse is applied to any one of the input conductors 351 through 353, a negative output pulse is provided on the line 354. To illustrate this assume that a negative pulse is applied to the line 351. This negative pulse is passed by the diode 355 to the output line 354. When the line 354 goes negative, the diodes 356 and 357 are rendered non-conductive, assuming the input lines 352 and 353 continue at ground potential. As soon as the negative pulse on the input line 351 terminates, this line returns to ground potential, and the ground level is conveyed to the output line 354. At this point the diodes 356 and 357 are rendered conductive again.

Figure 10:
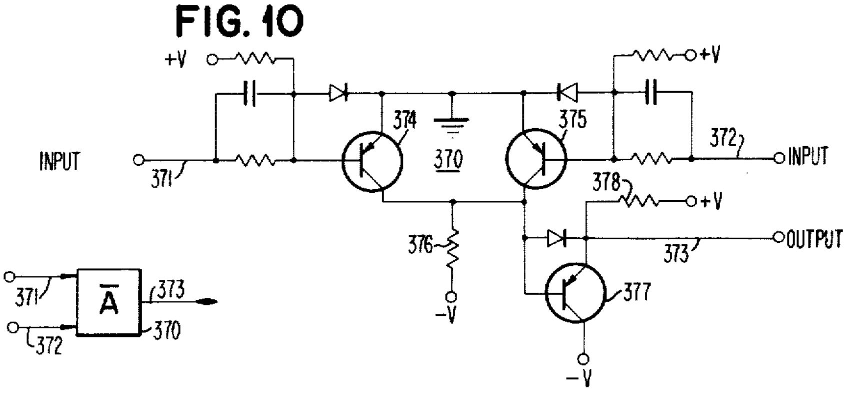
FIG. 10 is a circuit schematic of a $\overline{\text{AND}}$ which has two inputs and may be employed for that shown in block form in FIG. 6.

Referring next to FIG. 10, a negative AND ($\overline{\text{AND}}$) circuit 370 with two inputs is illustrated in detail. The $\overline{\text{AND}}$ circuit responds to positive level inputs on both conductors 371 and 372 and provides a negative output level on a conductor 373, if the input level to either the line 371 is at or above ground potential. If a positive or ground potential is applied to the input line 371 shown in the lower portion of FIG. 10, a transistor 374 is rendered non-conductive. If at the same time another positive potential is applied to the input line 373, a transistor 385 is rendered non-conductive. When both transistors 374 and 375 are rendered non-conductive, the negative source of supply connected to the resistor 376 is then applied to the base of a transistor 377. The transistor 377 is rendered conductive and the output signal on conductor 373 drops to a negative value. The resistor 378 and its positive source of potential in conjunction with the resistor 376 and its negative source of potential constitute a voltage divider network, and the values of these resistors and their voltage sources are selected so that the output potential on the conductor 373 is below ground potential. Accordingly, it is seen how two input levels which are positive may operate the $\overline{\text{AND}}$ circuit 370 to provide a negative output signal. If either input line 371 or 372 receives a negative signal, the associated transistor 374 or 375 is rendered conductive and the upper end of the resistor 376 is effectively connected to ground. In such case the base of the transistor 377 is connected to ground also. The transistor 377 is connected as an emitter follower, and is readily seen therefore that if the base is at ground potential the output line 373 is also at ground potential. Hence if only one of the input lines 371 or 372 is positive, the output line 373 is likewise rendered positive at or above ground potential.

Figure 11:
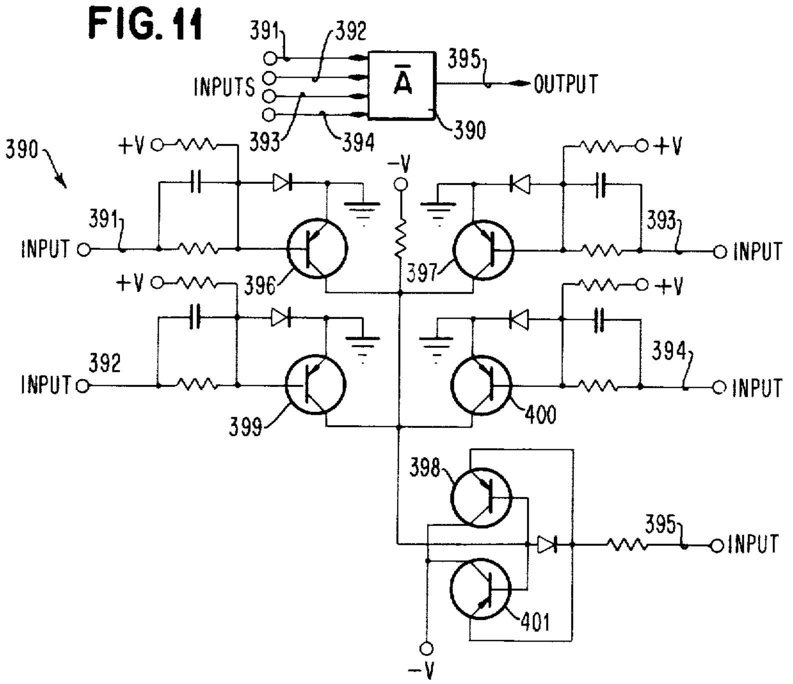
FIG. 11 shows a circuit schematic for a four input $\overline{\text{AND}}$ which may be employed for that shown in block form in FIG. 6.

Referring next to FIG. 11, a four input negative AND ($\overline{\text{AND}}$) circuit is shown in detail. The $\overline{\text{AND}}$ circuit 390 provides a negative output signal on a conductor 395 whenever all of the input lines 391 through 394 are energized with a positive level. Whenever any one of the input lines 391 through 394 has a negative level, the output signal on the line 395 is at or above ground potential. The four input $\overline{\text{AND}}$ circuit 390 in FIG. 11 is like the two input $\overline{\text{AND}}$ 370 shown in FIG. 10 except the number of inputs has been doubled. Note that the transistors 396, 397 and 398 plus the associated circuitry in FIG. 11 are identical to the transistors 374, 375 and 377 plus the associated circuitry in FIG. 10. The transistors 399, 400 and 401 plus associated circuitry in FIG. 11 are duplications of the transistors 396, 397 and 401 plus their associated circuitry. The operation of the $\overline{\text{AND}}$ circuit 390 in FIG. 11 is identical in operation to that of the negative AND circuit 370 in FIG. 10. It is felt that the operation of this circuit is readily understood from the description set forth above with respect to FIG. 10.

Figure 12:
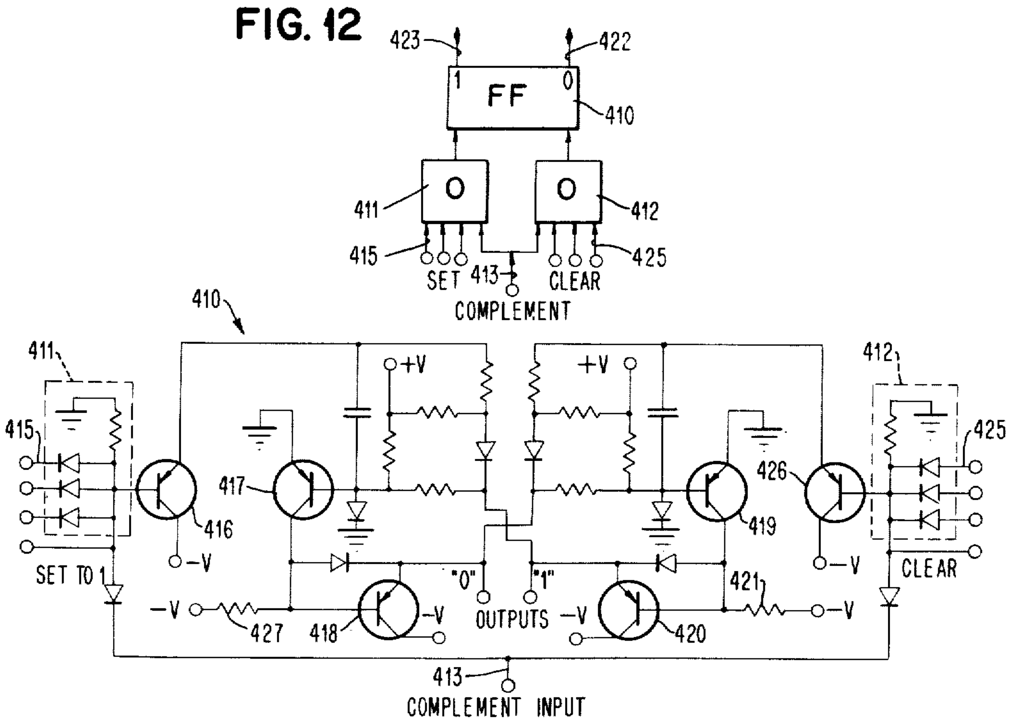
FIG. 12 is a circuit schematic of a flip-flop which may be employed for that illustrated in block form in FIGS. 2 through 6.

Referring next to FIG. 12, there is illustrated in detail a flip-flop 410 which may be employed for the flip-flops illustrated in block form throughout FIGS. 2 through 7. The flip-flop 410 in FIG. 12 is provided with OR circuits 411 and 412 which are coupled respectively to the One and Zero inputs. A complement input 413 is coupled to both of the OR circuits 411 and 412. The OR circuit 411 responds to a negative pulse on any of the input conductors except the complement input to set the flip-flop 410 to the One state thereby providing a negative output signal from the One output side. In like fashion the OR circuit 412 responds to a negative pulse on any one of its input terminals except the complement input to clear the flip-flop by setting it into Zero state, whereby a negative output signal is provided from the Zero output side. Assume for purposes of illustration that a pulse is applied to the input line 415 to the OR circuit 411. This negative pulse sets the flip-flop 410 to the One state, thereby providing a negative output signal from the One output side. Referring more specifically to the schematic diagram in FIG. 12, the negative pulse on the input conductor 415 drives the transistor 416 into the conductive state and applies a negative signal to the base of a transistor 417, rendering this transistor conductive. As soon as the transistor 417 is rendered conductive, the base of transistor 418 is pulled to ground potential, thereby turning this transistor off. As a consequence, the base of transistor 419 goes to some potential at or above ground, and this transistor is turned off. As soon as the transistor 419 is turned off, the transistor 420 is turned on because the base electrode goes to a minus potential supplied by a negative source of potential supplied by a negative source of potential through a resistor 421. When the transistor 420 is turned on, the minus potential applied to the collector electrode is coupled through this transistor to the One output terminal 422. The negative potential on the line 422 is coupled back to the base of the transistor 417 and maintains this transistor conductive. When the negative input pulse to the conductor 415 terminates, the transistors 417 and 420 remain conductive, whereby the output line 422 continues at a negative potential and the output line 423 continues at or above ground potential. In this condition the flip-flop is said to be in the One state.

If a negative pulse is applied to input terminal 425, the flip-flop 410 changes from the One state to the Zero state. The sequence of events may be followed by noting that the negative pulse on the input conductor 425 turns the transistor 426 on. This transistor then supplies a negative signal to the base of transistor 419, rendering it conductive. When the transistor 419 goes on, ground potential is coupled to the base of the transistor 420 and turns this transistor off. When the transistor 420 goes off, the transistor 417 also goes off since the negative holding potential previously supplied by the transistor 420 to the transistor 417 is now removed. When the transistor 417 goes off, the base of the transistor 418 goes negative since a negative source of potential is coupled through a resistor 427 thereto. The negative potential applied to the base of the transistor 418 renders this transistor conductive, and the negative source of potential connected to the collector electrode of the transistor 418 is coupled to the output line 423. The negative potential at the output line 423 is coupled to the base of transistor 419 and holds this transistor on. When the negative pulse on the input line 425 terminates, transistors 418 and 419 remain on, whereby the output line 423 continues at a negative level, and the output line 422 continues at a level at or above ground. In this condition of stability the flip-flop is said to be in the Zero state.

If a negative pulse is applied to the line 413, the flip-flop 410 undergoes a change in state. If the flip-flop is in the Zero state, it is changed to the One state, and if the flip-flop is in the One state, it is changed to the Zero state. If the flip-flop is in the Zero state when a negative pulse is applied to the line 413, both transistors 416 and 426 are turned on. Each of these transistors supplies a negative signal to the base of respective transistors 417 and 419. This negative signal is effective to turn the transistor 417 on. Since transistor 419 is already on, the negative signal supplied to the base of this transistor is ineffective. However, the negative signal applied to the base electrode of the transistor 417 is effective and the sequence of events which take place is identical to that described above when a negative pulse was applied to input conductor 415. It is readily seen that if the flip-flop is in the One state when a negative pulse is applied to the complement input line 413, the negative pulse is ineffective to change the conductive state of the transistor 417, but it is effective to change the transistor 419 from the off condition to the on condition. Consequently, the events which take place are identical to those described earlier with respect to an input pulse applied to the input conductor 425. Accordingly, it is seen that a pulse applied to the complement input terminal 413 is effective to reverse the existing condition of the flip-flop 410.

What is claimed is:

1. A device for deriving the product of two numbers comprising a multiplicand storage means, a multiplier storage means, an accumulator register, an adder coupled between the multiplicand storage means and the accumulator register, means coupled to the multiplier storage means for sampling the contents of the said multiplier storage means and generating a series of partial products in response to a single pulse applied thereto, said last named means including a series circuit forming a closed loop with a stage of said multiplier storage means when the first partial product is initiated and including a further means within said series circuit which opens the closed loop when a predetermined number of partial products have been generated.

2. The apparatus of claim 1 wherein the means coupled to the multiplier storage means for sampling and generating a series of partial products in response to a single input pulse includes means for generating a long or a short partial product cycle, a short cycle being generated when a given order of the multiplier storage means contains signals representative of one value and a long cycle being generated when a given order of the multiplier storage means contains signals representative of another value.

3. The apparatus of claim 2 further including a gate circuit disposed in the series circuit of the means coupled to the multiplier storage means for sampling and generating a series of partial products in response to a single input pulse, said gate circuit closing the loop of said series circuit before the generation of partial products commences, said gate circuit opening the loop when a predetermined number of partial products have been generated.

4. The apparatus of claim 3 further including a counter which is stepped once for each partial product which is generated, and means responsive to the counter for opening said gate circuit when the counter reaches a predetermined condition.

5. A multiplying device including means responsive to signals representative of a multiplier and a multiplicand for generating a series of partial products which are accumulated to provide a product, means coupled to said first named means and responsive to a single input pulse for generating the partial products, said last named means including a series circuit which is closed to form a loop with a portion of said first named means and which responds to a single input pulse that is cycled around the loop once for each partial product, and means within said series circuit for opening the loop when a predetermined number of partial products have been generated.

6. The apparatus of claim 5 wherein the series circuit includes means for sampling each order of the multiplier and generating a partial product cycle of one time duration when a given order of the multiplier represents a given value and for generating a partial product cycle of a relatively longer time period when a given order of the multiplier represents a different value.

7. A computing device including a multiplier, the multiplier having means for generating the product of two numbers by successively generating and accumulating partial products, said means including a series circuit forming a closed loop with a portion of said multiplier which responds to a single input pulse to cause the generation of successive partial products, and said means including further means for opening said series circuit after the generation of a predetermined number of partial products.

8. A multiplying device which derives the product of two numbers by successively generating and accumulating partial products, said multiplying device including a series coupled control circuit responsive to a stage of the multiplying device and which further responds to a single pulse to generate partial products each one requiring a first or second time period for its completion, the duration of said second time period exceeding the duration of the first time period, said series coupled control circuit including means for initiating the generation of the succeeding partial product as soon as each partial product is completed.

9. A device for deriving the product of a multiplier and a multiplicand comprising multiplier storage means, multiplicand storage means, product storing means, means coupled to said product storing means for determining the arithmetic sign of the final product, shifting means coupled to said product storing means, adder means coupled between said multiplicand storage means and said product storage means, a series circuit coupled to a portion of said multiplier storage means, said series circuit having a path forming a closed loop including a first delay means and a second delay means and providing an output to either shift the contents of said multiplier storage means and said product storage means or initiate an add operation to add the contents of said multiplicand storage means to the contents of said product storage means before the shift operations, and means to apply a single pulse which circulates around the closed loop a given number of times.

10. The combination as defined in claim 9 wherein said second delay means includes circuits to delay said pulse for a time duration greater than said first delay means.

11. The combination as defined in claim 10 including means within said series circuit for inhibiting the pulse at a predetermined condition.

12. The combination as defined in claim 11 wherein said inhibiting means includes a counter coupled to gating means.

13. The combination as defined in claim 10 wherein said means coupled to said product storage means for determining the arithmetic sign of the final product includes a serially connected gate and flip-flop.

14. A binary multiplying device for determining the product of a multiplier and a multiplicand by shifting the multiplier and product as it is accumulated or by adding the multiplicand to the product before shifting the multiplier and the product as it is accumulated according to the value of a binary digit comprising a series circuit coupled to sample the least significant digit of said multiplier, said series circuit further including a first delay means, a second delay means and gating means, and pulse initiation means coupled to said series circuit for engaging the first delay means or the second delay means according to the value of said least significant digit of the multiplier.

15. The combination as defined in claim 14 including means to repetitively generate said pulse from said pulse initiation means for a predetermined number of traversals about said series circuit.

16. A device for deriving the product of two numbers comprising a multiplicand storage means for storing a plurality of bits representing a multiplicand, a multiplier storage means for storing a plurality of bits representing a multiplier, an accumulator register, an adder coupled between the multiplicand storage means and the accumulator register, a control circuit coupled to said multiplier storage means and the adder and the accumulator for generating partial products, said control circuit including sampling means to inspect each bit of the multiplier and generate a long or short partial product cycle depending on the value of the bit inspected, a short cycle effecting a shift of the previous partial product and a long cycle effecting an addition of the multiplicand and the previous partial product and a shift of the result, said control circuit including a path forming a closed loop, said control circuit responding to a single input pulse which continuously recirculates around the loop once for each partial product, and said control circuit including means to inhibit further circulations of said input pulse after the generation of a predetermined number of partial products.

17. A device for deriving the product of two numbers comprising a multiplicand storage means for storing a plurality of bits representing a multiplicand, a multiplier storage means for storing a plurality of bits representing a multiplier, an accumulator register, an adder coupled between the multiplicand storage means and the accumulator register, a control circuit coupled to said multiplier storage means and the adder and the accumulator for generating partial products, said control circuit including means to shift the content of the multiplier storage means and to inspect each bit of the multiplier as it stands in a given bit position, said control circuit serving to generate a long or short partial product cycle for each bit of the multiplier depending on the value of the bit inspected, a short cycle effecting an addition of the multiplicand and the previous partial product and a shift of the result, said control circuit including a path forming a closed loop, said control circuit responding to a single input pulse which is continuously regenerated and circulated around the loop once for each partial product, and said control circuit including counting means to inhibit further circulations of said input pulse after the generation of a predetermined number of partial products.

References Cited in the file of this patent

UNITED STATES PATENTS

| | | |
|---|---|---|
| 2,776,794 | Williams et al. | Jan. 8, 1957 |
| 2,895,672 | Dickinson | July 21, 1959 |
| 2,914,248 | Ross | Nov. 24, 1959 |
| 2,936,115 | Alexander et al. | May 10, 1960 |
| 3,018,958 | Walker et al. | Jan. 30, 1962 |

FOREIGN PATENTS

| | | |
|---|---|---|
| 802,656 | Great Britain | Oct. 8, 1958 |

OTHER REFERENCES

Pomerene: Register Transfer Check, IBM Technical Disclosure Bulletin, vol. I, No. 4, December 1958, pp. 18 and 19.

UNITED STATES PATENT OFFICE

CERTIFICATE OF CORRECTION

Patent No. 3,085,747 April 16, 1963

Charles J. Tilton

It is hereby certified that error appears in the above numbered patent requiring correction and that the said Letters Patent should read as corrected below.

Column 17, lines 27 and 33, for the claim reference numeral "10", each occurrence, read -- 9 --.

Signed and sealed this 22nd day of October 1963.

(SEAL)
Attest:

ERNEST W. SWIDER
Attesting Officer

EDWIN L. REYNOLDS
Acting Commissioner of Patents